(12) United States Patent
O'Sullivan et al.

(10) Patent No.: US 9,171,069 B2
(45) Date of Patent: Oct. 27, 2015

(54) METHOD AND APPARATUS FOR ANALYZING A DOCUMENT

(75) Inventors: Thomas O'Sullivan, Woodridge, IL (US); Andrzej Jachowicz, Tower Lakes, IL (US)

(73) Assignee: FREEDOM SOLUTIONS GROUP, LLC, Downers Grove, IL (US)

( * ) Notice: Subject to any disclaimer, the term of this patent is extended or adjusted under 35 U.S.C. 154(b) by 447 days.

(21) Appl. No.: 13/563,257

(22) Filed: Jul. 31, 2012

(65) Prior Publication Data

US 2014/0040270 A1 Feb. 6, 2014

(51) Int. Cl.
G06F 17/21 (2006.01)
G06F 17/30 (2006.01)
G06F 17/22 (2006.01)
G06F 17/27 (2006.01)

(52) U.S. Cl.
CPC ...... *G06F 17/30702* (2013.01); *G06F 17/2241* (2013.01); *G06F 17/277* (2013.01)

(58) Field of Classification Search
USPC ........................................ 704/1–10
See application file for complete search history.

(56) References Cited

U.S. PATENT DOCUMENTS

| | | | |
|---|---|---|---|
| 6,026,388 A | | 2/2000 | Liddy et al. |
| 6,067,520 A | * | 5/2000 | Lee ............................... 704/270 |
| 6,098,034 A | | 8/2000 | Razin et al. |
| 6,137,911 A | * | 10/2000 | Zhilyaev ........................ 382/225 |
| 7,111,238 B1 | | 9/2006 | Kuppusamy et al. |
| 7,197,706 B1 | | 3/2007 | Berson et al. |
| 7,236,923 B1 | | 6/2007 | Gupta |
| 7,359,849 B2 | | 4/2008 | Palmquist |
| 7,500,194 B2 | | 3/2009 | Collins et al. |
| 7,577,905 B2 | | 8/2009 | Collins et al. |
| 7,627,816 B2 | | 12/2009 | Bhogal et al. |
| 7,685,529 B2 | | 3/2010 | Shaw et al. |
| 7,707,139 B2 | | 4/2010 | Okamoto et al. |
| 7,739,259 B2 | | 6/2010 | Hartwell et al. |
| 7,881,932 B2 | * | 2/2011 | Muschett ...................... 704/244 |
| 7,886,290 B2 | | 2/2011 | Dhanjal et al. |
| 7,895,531 B2 | | 2/2011 | Radtke et al. |
| 8,117,542 B2 | | 2/2012 | Radtke et al. |
| 8,146,016 B2 | | 3/2012 | Himberger et al. |
| 8,150,930 B2 | | 4/2012 | Satterfield et al. |

(Continued)

OTHER PUBLICATIONS

Canadian Examination Search Report, dated Jan. 27, 2015, 4 pages.

(Continued)

*Primary Examiner* — Leonard Saint Cyr
(74) *Attorney, Agent, or Firm* — Vedder Price, P.C.

(57) ABSTRACT

Method, apparatus, and computer-readable medium are provided for analyzing a document including text. In one example, a method for identifying patterns in a document is described. The method includes identifying a plurality of candidate phrases in the document based on candidate identification criteria, grouping the candidate phrases of the plurality of candidate phrases with a phrase family based on family criteria and comparison between candidate phrases of the plurality of candidate phrases to obtain consistent phrases, and, for remaining phrases not meeting all of the candidate identification criteria, associating at least one of the remaining phrases with a phrase family based on inconsistent phrase criteria to obtain inconsistent phrases. Identified in this manner, the inconsistent phrase may be displayed via a user interface to permit a user the opportunity to determine whether an inconsistent phrase requires modification.

18 Claims, 11 Drawing Sheets

(56) References Cited

U.S. PATENT DOCUMENTS

| | | | |
|---|---|---|---|
| 8,176,067 B1* | 5/2012 | Ahmad et al. | 707/765 |
| 8,200,666 B2 | 6/2012 | Bartomeli et al. | |
| 8,201,103 B2 | 6/2012 | Dukhon et al. | |
| 8,239,882 B2 | 8/2012 | Dhanjal et al. | |
| 8,255,828 B2 | 8/2012 | Harris et al. | |
| 8,296,651 B2 | 10/2012 | Bravery et al. | |
| 8,402,096 B2 | 3/2013 | Affronti et al. | |
| 8,484,578 B2 | 7/2013 | Gordner et al. | |
| 8,510,308 B1* | 8/2013 | Pasca et al. | 707/740 |
| 8,515,736 B1* | 8/2013 | Duta | 704/9 |
| 8,521,506 B2 | 8/2013 | Lancaster et al. | |
| 8,600,785 B2 | 12/2013 | Carey et al. | |
| 8,605,090 B2 | 12/2013 | Garg et al. | |
| 8,620,793 B2 | 12/2013 | Knyphausen et al. | |
| 8,627,222 B2 | 1/2014 | Hartwell et al. | |
| 8,689,137 B2 | 4/2014 | McCormack et al. | |
| 8,739,031 B2 | 5/2014 | Cheung et al. | |
| 8,744,882 B2 | 6/2014 | Carey et al. | |
| 8,762,880 B2 | 6/2014 | Dukhon et al. | |
| 8,799,808 B2 | 8/2014 | Satterfield et al. | |
| 8,839,139 B2 | 9/2014 | Leukart et al. | |
| 8,867,048 B2 | 10/2014 | Martin | |
| 8,874,427 B2 | 10/2014 | Ross et al. | |
| 2003/0005062 A1* | 1/2003 | Hachiya et al. | 709/206 |
| 2003/0200211 A1 | 10/2003 | Tada et al. | |
| 2004/0030540 A1* | 2/2004 | Ovil et al. | 704/1 |
| 2004/0148156 A1 | 7/2004 | Hawkins | |
| 2005/0021554 A1* | 1/2005 | Inokuchi et al. | 707/102 |
| 2005/0171758 A1 | 8/2005 | Palmquist | |
| 2006/0005247 A1 | 1/2006 | Zhang et al. | |
| 2009/0112812 A1 | 4/2009 | Ellis et al. | |
| 2009/0319927 A1 | 12/2009 | Beeman et al. | |
| 2011/0035656 A1 | 2/2011 | King et al. | |
| 2011/0055206 A1 | 3/2011 | Martin et al. | |
| 2011/0167062 A1 | 7/2011 | Nonaka | |
| 2011/0270603 A1* | 11/2011 | Ovil et al. | 704/9 |

OTHER PUBLICATIONS

UK Search Report issued in U.K. Application No. 1300134.2 on Jun. 24, 2014.

UK Search Report issued in U.K. Application No. 1300137.5 on Jun. 24, 2014.

Search & Examination Report issued by the Intellectual Property Office of the United Kingdom on Dec. 19, 2013.

* cited by examiner

METHOD AND APPARATUS FOR ANALYZING A DOCUMENT

RELATED APPLICATIONS

This application is related to co-pending U.S. patent application Ser. No. 13/343,423 filed on Jan. 4, 2012.

FIELD

The present disclosure relates to a method and apparatus for analyzing a document.

BACKGROUND

Tools exist to aid with electronic document analysis, proofreading, and editing. Generally, such tools are software programs capable of interfacing with word processing software (e.g., Microsoft Word™) used to create the electronic document. For example, conventional tools are capable of obtaining extensive information about electronic documents that are normally opened in a word processing software program. This information may include characteristics describing the electronic document itself and/or characteristics describing the electronic document's text.

With regard to characteristics describing an electronic document itself, these characteristics may include information describing the number of paragraphs in the document, the size of the document, the creation date of the document, the last edit date of the document, security restrictions associated with the document, the file name of the document, etc. With regard to characteristics describing the electronic document's text, these characteristics may include information describing "primary attributes" of the text (e.g., whether specific text is capitalized and positional information regarding the text) and "secondary attributes" of the text (e.g., whether specific text is italicized, bolded, and/or underlined, the font size of specific text, the font type of specific text, etc.).

After obtaining characteristics describing an electronic document itself and the text within a given electronic document, these conventional tools analyze the text and the characteristics in order to provide additional useful information about the document. Frequently, this additional useful information is provided via a user interface, such as a graphical user interface displayed on a display screen. In this manner, a person using such a conventional tool can review the useful additional information and make changes to the underlying electronic document as needed. By way of example and not limitation, such additional useful information may include the following information about a given electronic document: information identifying all of the defined terms in the document, information identifying potentially inconsistent uses of phrases within the document, information identifying possible editing mistakes within the document, information identifying possible incomplete segments of the text within the document, etc.

The user interface that displays the useful additional information is often provided in a manner that allows it to be viewed simultaneously with the electronic document itself. Furthermore, the user interface is frequently interactive, such that if a user selects (e.g., by clicking a mouse) a particular piece of information being displayed in the user interface (e.g., a particular defined term among a list of defined terms), the view of the document in the word processing software user interface will change to, e.g., show the first instance of the defined term that was selected within the document. Accordingly, existing tools for performing document analysis, editing, and proofreading provide useful mechanisms for ensuring consistency and preventing ambiguity within electronic documents such as legal contracts.

However, existing tools for performing document analysis, editing, and proofreading also suffer from a number of drawbacks. For example, existing tools for performing document analysis, editing, and proofreading are known to require user intervention in order to update the tool's user interface after a change has been made to the text in the underlying document under analysis. Accordingly, a need exists for a method and apparatus designed to generate an updated user interface for displaying additional useful information without user intervention following a change to the text of the electronic document under analysis.

Another drawback of existing tools is the poor performance of existing tools in finding subtle errors and in differentiating between variations in the language of a document and unintended inconsistencies in a document. Existing tools can be under inclusive (i.e., not identifying unintended inconsistencies) or over inclusive (i.e., identifying normal variations in the language of a document). These drawbacks make the identification of errors and the correction of documents more difficult.

SUMMARY

The instant disclosure describes techniques and an apparatus for analyzing a document including text. In one embodiment, a method for identifying patterns in a document is described. The method includes identifying a plurality of candidate phrases in the document based on candidate identification criteria, grouping the candidate phrases of the plurality of candidate phrases with a phrase family based on family criteria and comparison between candidate phrases of the plurality of candidate phrases to obtain consistent phrases, and, for remaining phrases not meeting all of the candidate identification criteria, associating at least one of the remaining phrases with a phrase family based on inconsistent phrase criteria to obtain inconsistent phrases.

In another embodiment, the method further includes generating an inconsistent phrase user interface including a representation of the phrase family, the consistent phrases, and the inconsistent phrases.

In another embodiment, the method further includes generating a phrase criteria user interface that includes an adjustable candidate identification criteria control, an adjustable family criteria control, and an adjustable inconsistent phrase criteria control.

In still another embodiment, the candidate identification criteria include at least one of a frequency of a phrase in the document, a number of words in the phrase and a number of characters in the phrase.

Related apparatus and computer-readable media are also disclosed.

BRIEF DESCRIPTION OF THE DRAWINGS

The disclosure will be more readily understood in view of the following description when accompanied by the below figures and wherein like reference numerals represent like elements, wherein.

DETAILED DESCRIPTION

Figure 1:
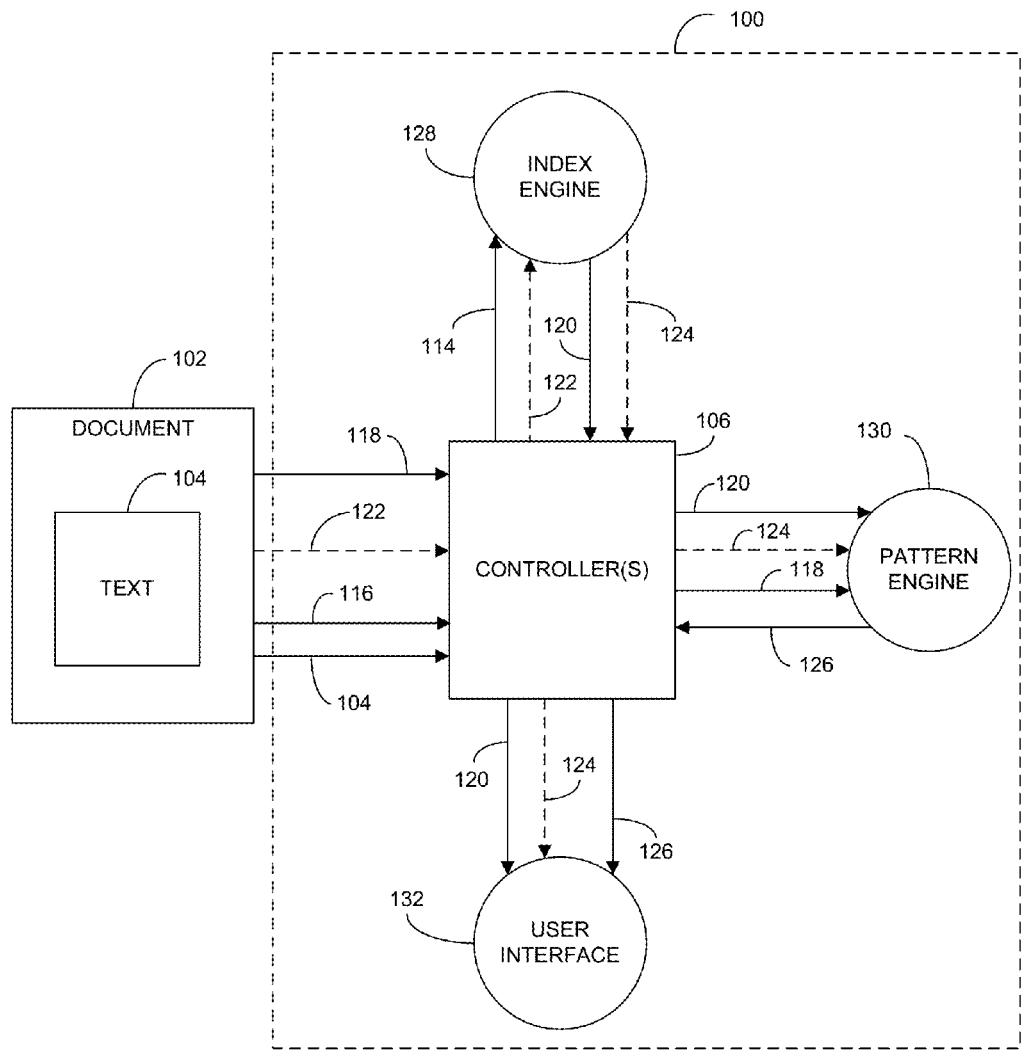
FIG. 1 is a block diagram generally depicting one example of an apparatus in accordance with the present disclosure.

The following description of the embodiments is merely exemplary in nature and is in no way intended to limit the disclosure, its application, or uses. FIG. 1 illustrates an apparatus 100 for analyzing a document 102 including text 104 in accordance with the present disclosure. As used herein, a document, such as document 102, includes any electronic document capable of being viewed using any known word processing program. Apparatus 100 includes one or more controllers 106, an index engine 128, a pattern engine 130, and a user interface 132. In practice, the functionality of apparatus 100 may be implemented, for example, using the device 500 of FIG. 5 as described below. In one example, the index engine 128 and pattern engine 130 may comprise software modules configured to perform the functionality described herein when executed by a suitable processing device, such as device 500 of FIG. 5. In one example, the user interface 132 is implemented as display data configured for display on a suitable display device, such as display 508 of FIG. 5.

Via the controller(s) 106, apparatus 100 is configured to communicate with, for example, a word processing program (e.g., Microsoft Word™; not shown) that has an electronic document 102 opened in it. Although controller(s) 106 are illustrated as being directly connected to document 102, those having ordinary skill in the art will appreciate that information 104, 116, 118, 122 may be communicated between the document 102 and apparatus 100 over one or more private or public communication networks, databus(ses), or other communication channels equally well using suitable techniques known in the art.

The illustrated controller(s) 106 operate to interact with and manage communications between the document 102, index engine 128, pattern engine 130, and user interface 132. For example, the controller(s) 106 obtain text 104 from the document 102 to provide obtained text 114. In one example, the text 104 is automatically furnished from the word processing program within which the document 102 is open to the apparatus 100 (i.e., pushed) in order to provide the obtained text 114. However, in another embodiment, the apparatus 100 fetches the text 104 from the document 102 (i.e., pulls the text 104) in order to provide the obtained text 114. In either case, techniques for obtaining text 104 from a document 102 opened in a word processing program are well known to those having ordinary skill in the art (e.g., via a suitable application programming interface (API)) and will not be discussed in additional detail in the instant disclosure.

Controller(s) 106 are further operative to provide the obtained text 114 to the index engine 128. The index engine 128 is operative to generate a plurality of indices representative of the obtained text 120. In one example, the index engine 128 is operative to generate at least one document-level index and at least one paragraph-level index. For example, in an embodiment, the index engine 128 parses the obtained text 114 from beginning to end to identify occurrences of new paragraphs. Each new occurrence of a paragraph is created as a new entry in the at least one paragraph-level index. While the instant disclosure discusses generating indices on a document-level and a paragraph-level, other levels of abstraction (e.g., sentence-level, word-level, character-level) may be equally employed as a design choice. Furthermore, the instant disclosure recognizes that it may be desirable to generate one or more paragraph-level indices that only contain paragraphs from the document's text 104 that are numbered. In this example, the indices may include both the number assigned to that paragraph (e.g., "5" for the fifth numbered paragraph in a document 102) as well as the text included within that paragraph.

As will be discussed in additional detail below with regard to FIG. 2, each document-level index includes a copy of all of the text in an entire document, such as document 102. Conversely, each paragraph-level index only includes data representative of all of the text in a given paragraph of an entire document, such as document 102. Thus, if document 102 included two paragraphs worth of text, in one example, index engine 128 would be operative to generate (1) a single document-level index including a copy of all of the text in the entire document (i.e., all of the text in each of the two paragraphs) and (2) two separate paragraph level indices, where each individual paragraph-level index includes a copy of all of the text within a single paragraph of the document. As will be discussed in greater below with regard to FIG. 2, in many instances there will be a plurality of indices produced on both a document-level and a paragraph-level.

Once the plurality of indices representative of the obtained text 120 have been generated, the index engine 128 may provide the plurality of indices 120 to the controller(s) 106 for further processing. The controller(s) 106 are operative to generate the user interface 132 based on the plurality of indices representative of the obtained text 120.

Figure 3:
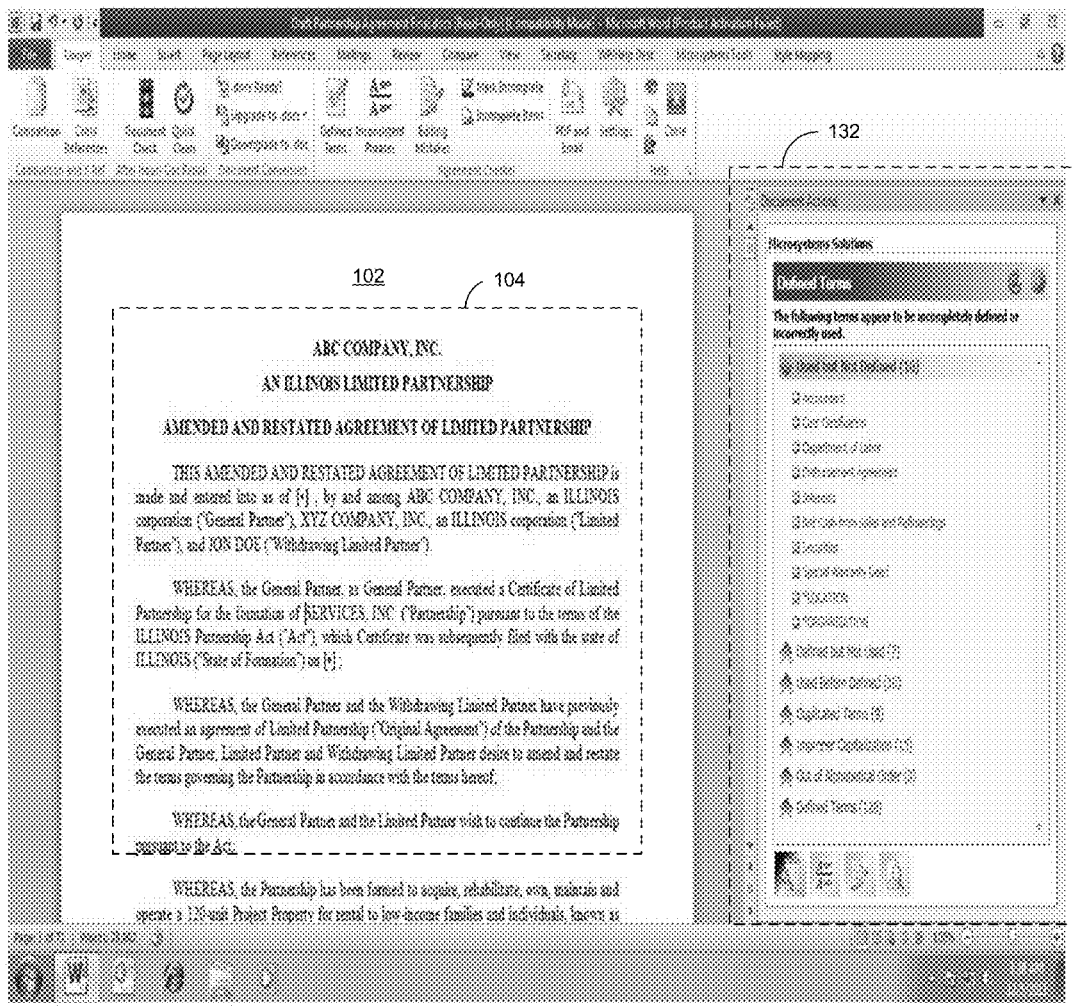
FIG. 3 illustrates one example of a user interface that may be generated and updated in accordance with the present disclosure.

FIG. 3 illustrates an exemplary user interface 132 consistent with the teachings of the instant disclosure. In the example illustrated in FIG. 3, user interface 132 is provided as part of a larger user interface for the word processing program in which the document 102, including text 104, is opened. In this manner, a person using apparatus 100 is capable of viewing both the underlying electronic document 102 and the user interface 132 of apparatus 100 simultaneously. Alternatively, the user interface 132 could be presented separate from, but adjacent to, the word processing program. Techniques for implementing user interfaces, such as user interface 132, are well known to those having ordinary skill in the art.

The user interface 132 of FIG. 3 is shown in a "Defined Terms" mode. In the Defined Terms mode, the user interface 132 includes categories of terms (e.g., letters, words and/or phrases within the document's text 104) that appear to be incompletely defined or incorrectly used based upon determinations made by the pattern engine 130 (in-line with the functionality of the pattern engine 130 described below). For example, a first category is labeled "Used but Not Defined (10)." As an initial matter, the "(10)" indicates that the document's text 104 includes ten terms that are used within the document 102, but that are not supplied with a formal definition within the document text 104. With continued reference to the category Used but Not Defined, the term "Accountant" is contained in the list of terms for this category. This indicates, for example, that the term Accountant is used somewhere within the document text 104, but that the term Accountant is not supplied with a formal definition within the text 104.

The techniques employed for determining which specific terms should occupy categories such as Used but Not Defined are known by those having ordinary skill in the art and will not be discussed in detail herein. However, other categories that may be processed by the pattern engine 130 and suitably included within a user interface 132 in a Defined Terms mode include "Defined but Not Used," "Used Before Defined," "Duplicated Terms," "Improper Capitalization," "Out of Alphabetical Order," and "Defined Terms."

The Defined but Not Used category lists terms that are supplied with a formal definition in the text 104 (e.g., within a "Definitions" section of the text 104), but that are not used anywhere else in the text. The Used Before Defined category lists terms that are generally used in the text before their definition, however, certain exceptions to this rule may exist. For example, page 1 of the document may include the term "120-unit Project Property," however, this term might not be formally defined until page 5 of the document. Thus, the term "120-unit Project Property" would be displayed within the Used Before Defined category of the user interface 132 in this example. The Duplicated Terms category includes terms that are, for example, of concern because they are defined twice within the same document 102. The Improper Capitalization category includes terms, for example, that are defined within the document (e.g., if the term "Accountant" is formally defined within the document) but that are used within the document without the expected capitalization (e.g., the term "accountant" is found elsewhere in the document without the first "a" being capitalized). The Out of Alphabetical Order category includes defined terms that are listed out of alphabetical order. For example, where the document 102 includes a "Definitions" section, oftentimes the terms that are defined within that section are listed in alphabetical order (e.g., "Accountant" is likely defined before "Cost Certification"). Thus, the Out of Alphabetical Order category lists terms that appear to be out of alphabetical order within the document's text 104. Finally, the Defined Terms category includes terms that are properly defined, as determined by the pattern engine 130.

Although not shown in FIG. 3, the user interface 132 may also operate in additional modes beyond the Defined Terms operating mode described above. For example, the user interface may also operate in an "Inconsistent Phrases" operating mode, whereby phrases that are not used consistently within the text 104 are identified. In another example, the user interface may operate in an "Editing Mistakes" operating mode (as will be described in more detail later), whereby common editing mistakes are identified and displayed. For example, anytime an open bracket is provided without a complementary closed bracket, this editing mistake may be displayed on the user interface 132. The foregoing exemplary operating modes are not intended to be exhaustive, and those having ordinary skill in the art will appreciate that other similar operating modes for the user interface 132 may also be provided in accordance with the instant disclosure. As those of ordinary skill in the art will appreciate, the techniques described herein are equally applicable to the various Defined Terms, Inconsistent Phrases, and Editing Mistakes operating modes described herein, or other modes, the operation of which is dependent upon editable documents.

With continued reference to FIG. 3, the user interface 132 is operative to receive input from a user, e.g., though user interaction with a mouse, keyboard, microphone, or any other suitable input mechanism known in the art. For example, if a user were to click a mouse cursor over the term "Accountant" found within the category Used but Not Defined, the view in the word processing program's user interface would change to show the selected instance of the term Accountant within the document. In one example, this functionality may be accomplished by apparatus 100 communicating with the word processing program within which the document is opened via the API discussed above. For example, the apparatus 100 may instruct the word processing program to display the particular instance of the selected term. In one example, the apparatus 100 may further instruct the word processing program via the API to highlight the term that was selected to further delineate the location of the sought after term. The apparatus 100 may use paragraph identification information and relative position information regarding the selected term to instruct the word processing program exactly what to display.

Returning to the discussion of the operation of the apparatus 100 of FIG. 1, once the index engine 128 generates the plurality of indices representative of the obtained text 120, this information 120 may be provided to the pattern engine 130 via the controller(s) 106. In addition, the pattern engine 130 may be provided with secondary attributes data 118. The secondary attributes data 118 is data describing which text 104 of the document has been underlined, italicized, and/or bolded and, as illustrated, is obtained by the controller(s) 106 from the document 102 via, for example, the API. In one embodiment, the secondary attributes data 118 may be obtained at the same time as the initial parsing of the text 104. In another embodiment, the secondary attribute data 118 may be obtained after the initial parsing of the text 104. For example, the secondary attribute data 118 may be obtained when it is needed by the pattern engine 130 to identify patterns in the obtained text 114. As such, in one example, the secondary attribute data 118 may be only obtained as needed, for example, by the pattern engine 130 in identifying patterns within the obtained text 114. In another example, the secondary attribute data 118 may be stored, for example, in storage 504 discussed below with regard to FIG. 5. In any event, based upon the plurality of indices representative of the obtained text 120 and the secondary attributes data 118, the pattern engine 130 is operative to generate pattern data 126. Pattern data 126 describes a particular term contained within the text 104 that should be categorized and displayed by the user interface 132 in accordance with patterns corresponding to the various operating modes as provided above.

In one example, the pattern engine 130 relies upon user-supplied rules (i.e., patterns) to identify terms within the text 104 that meet any of the characteristics of, for example, the Defined Terms operating mode of the user interface 132 described above. For example, a user-supplied rule might provide that a word/phrase that is (1) found within quotation marks and (2) has the first letter capitalized should be treated as a defined term. Accordingly, when the pattern engine 130 identifies a term from the text such as "Accountant" (e.g., by parsing one or more of the plurality of indices representative of the obtained text 120), it treats that term as a defined term and includes that information in the pattern data 126. Thus, because the pattern data 126 is supplied to the user interface 132 via the controller(s) 106, the user interface may display the term "Accountant" within the Defined Terms category (e.g., when the user interface is in the Defined Terms operating mode).

In another example, the pattern engine 130 relies upon pre-defined rules to identify terms within the text 104 that meet any of the characteristics of, for example, the Used but Not Defined Terms operating mode of the user interface 132 described above. This embodiment operates similarly to the embodiment discussed above (i.e., the user-supplied rule embodiment), however, in this embodiment the pattern engine 130 relies upon pre-defined (e.g., hard-coded) rules in performing its processing. For example, a pre-defined rule might state that terms having their first letter capitalized should be considered for inclusion in the Used but Not Defined Terms category. Another pre-defined rule might further refine the universe of candidate Used but Not Defined Terms to those terms having their first letter capitalized that are not found within the Table of Contents section of the document (e.g., because most terms have their first letter capitalized in the Table of Contents). Regardless, after identifying patterns in the text 104 consistent with the pre-defined rules, the pattern engine 130 is operative to include that information in the pattern data 126 for use by the user interface 132.

The foregoing discussion of the operation of apparatus 100 describes an initialization phase that is instituted the first time that the apparatus 100 is used to analyze a document 102 including text 104. However, frequently, a user will want to edit the text 104 of the underlying document 102 while still utilizing the apparatus 100 (e.g., while retaining the user interface 132 on a display screen). Accordingly, it is one object of the present disclosure to provide a user interface 132 that updates substantially in real-time to reflect any changes to the text 104 of the underlying document 102 without user intervention.

To this end, in one example, the apparatus 100 is operative to monitor the document 102 for a change in the text 104. For example, the controller(s) 106 may monitor the document 102 for a change in the text 104. As used herein, monitoring may include, for example, periodically polling the word processing software that the document 102 is open in to determine whether the text 104 has changed since a previous poll. In another example, the word processing software may notify, for example, the controller(s) 106 that the text 104 has been changed by providing, for example, a notification of "a change event" 116. In this manner, the apparatus 100 effectively listens for a change event, where a change event includes an indication that the text 104 has been modified in any way since a previous accounting of the text 104 in the document 102 by apparatus 100 (e.g., a deletion, insertion, or modification of the text 104). For example, those having skill in the art will appreciate that existing word processing software (e.g., Microsoft Word™) is capable of tracking the occurrence of, and sending a notification 116 of, a change event.

Upon detecting a change in the text 104 (e.g., by polling the word processing software or receiving a change event notification 116), the apparatus 100 obtains the changed text 122 from the document 102. As used herein, the changed text 122 may include (1) only that portion of the original text 104 that was changed, (2) a new copy of all of the text from the document 102, including the changed text 122, or (3) the changed text 122 and some portion of the original text that remained unchanged. For example, in one embodiment, where text 104 in a particular paragraph of the document 102 has changed (e.g., one word is changed in the paragraph), the entire paragraph including the changed text (collectively, changed text 122) is provided to the apparatus 100. Accompanying the changed text 122 is location information identifying, for example, (1) the paragraph number of the paragraph including the changed text and (2) the location within that paragraph of the changed text. Regardless, after obtaining the changed text 122 the controller(s) 106 pass the changed text 122 on to the index engine 128 for further processing. The index engine 128 is operative to update the plurality of indices 120, such that the updated plurality of indices 124 are representative of the changed text 122. The updated plurality of indices 124 are then provided to the pattern engine 130 and the user interface 124.

Upon receiving the updated plurality of indices 124, the pattern engine 130 is operative to update the pattern data 126 to reflect the changed text 122. Accordingly, the updated pattern data 126 and the updated plurality of indices 124 are used by the controller(s) 106 to generate an updated user interface 132 reflecting the changed text 122 without user intervention. As used herein, the phrase "without user intervention" means that a user does not need to take any affirmative action (other than changing the text in the underlying document) in order for the user interface 132 to update. This stands in stark contrast to existing tools for analyzing a document where users are required to "refresh" a user interface (e.g., click the mouse cursor on a refresh button that triggers an update process) after making changes to the text of the underlying document. In contrast, in line with the teachings of the present disclosure, merely changing the text 104 in the document 102 is sufficient to trigger the process whereby the apparatus 100 automatically updates the user interface 132 to reflect the changed text 122.

Figure 2:
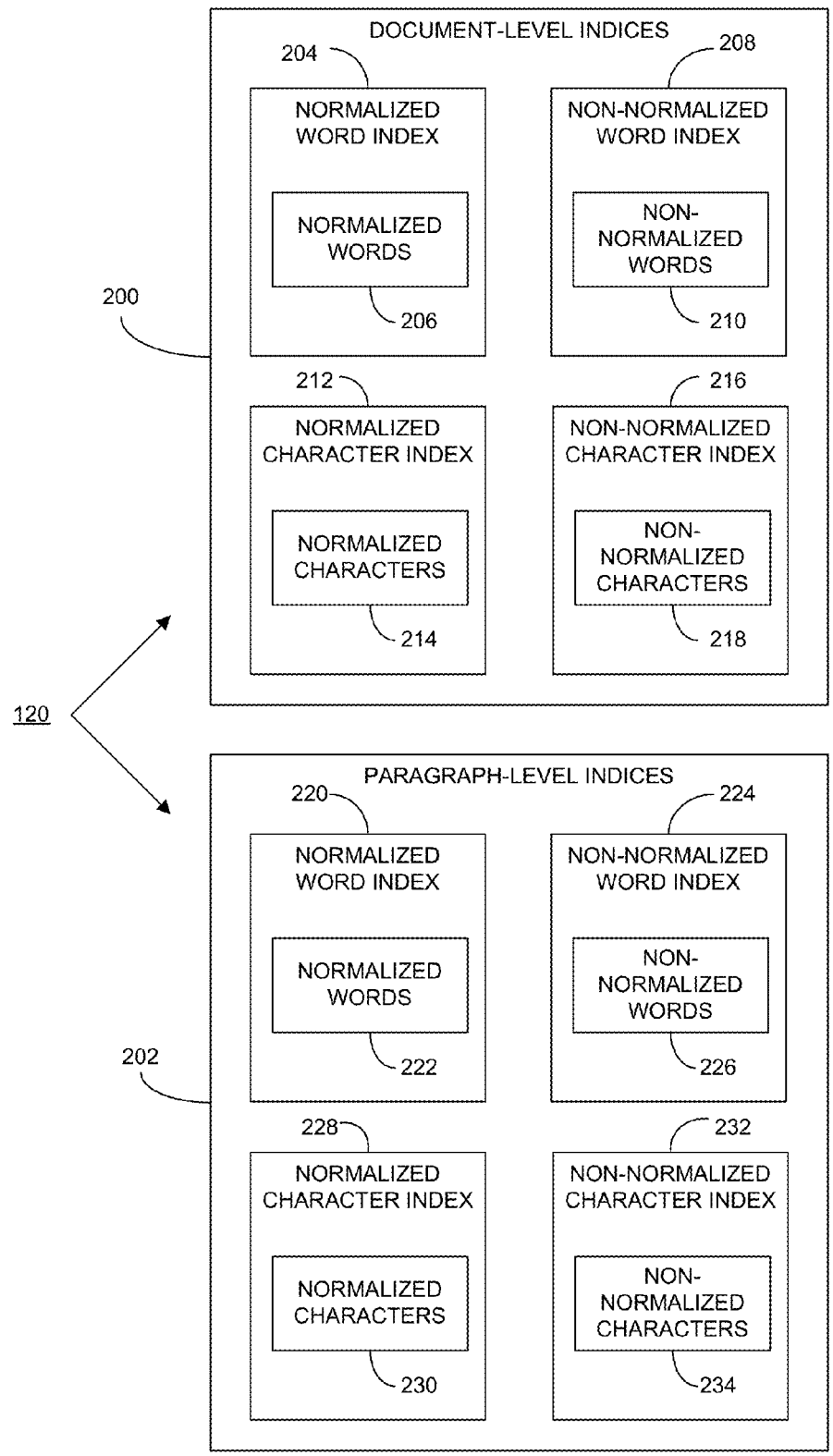
FIG. 2 is a block diagram generally depicting one example of document-level indices and paragraph-level indices in accordance with the present disclosure.

Referring now to FIG. 2, a detailed view of one example of the plurality of indices representative of the obtained text 120 is provided. As shown in FIG. 2, in one example, the plurality of indices representative of the obtained text 120 may include document-level indices 200 and paragraph-level indices 202. In this example, the document level indices 200 include a normalized word index 204, a non-normalized word index 208, a normalized character index 212, and a non-normalized character index 216. In one example, the normalized indices and the non-normalized indices may be generated simultaneously from the obtained text 114.

The document-level normalized word index 204 includes normalized words 206. Normalized words 206 include all words in the obtained text 114. Stated another way, normalized words 206 include all words in the entire document 102, however, the words have been "normalized." As used herein, normalized means that all of the capitalization associated with the words in the obtained text 114 has been removed. Consider an example where the only text 104 in a document 102 is the phrase "See Spot Run!" (i.e., the obtained text 114 is simply "See Spot Run!"). In this scenario, the document-level normalized word index 204 would include the normalized words 206 "see spot run!". Thus, the document-level normalized word index 204 includes a normalized set of all of the words in the entire document 102 (where spaces and punctuation marks are treated as being words for the purposes of indexing). Stripping the words of any capitalization information in this manner can provide for processing efficiency gains when, for example, performing pattern recognition with the pattern engine 130.

Conversely, the document-level non-normalized word index 208 includes non-normalized words 210. Non-normalized words 210 include all of the words in the obtained text 114, however, these words have not been "normalized." That is to say, the non-normalized words 210 retain capitalization information associated with the obtained text 114. Referring back to the above-example where the only text 104 in the document 102 is the phrase "See Spot Run!", the document-level non-normalized word index 208 would include the non-normalized words 210 "See Spot Run!". Retaining capitalization information associated with the words in the document 102 assists with, for example, pattern recognition by the pattern engine 130. For example, defined terms within a document 102 often start with a capital letter. Accordingly, the pattern engine 130 can parse the non-normalized word index 208 in order to identify candidate defined terms.

The document-level normalized character index 212 includes normalized characters 214. Normalized characters 214 include all characters in the obtained text 114. However, in line with the above discussion on normalization, all of the capitalization information associated with the obtained text 114 has been removed. Thus, continuing with the example provided above, if the only text 104 in the document 102 is the phrase "See Spot Run!", then the document-level normalized character index 212 would include the normalized characters 214 "see spot run!". As with the word indices discussed above, spaces and punctuation marks are treated as characters for the purposes of indexing.

The document-level non-normalized character index 216 includes non-normalized characters 218. Non-normalized characters 218 include all of the characters in the obtained text 114, however, these characters have not been "normalized." That is to say, the non-normalized characters 218 retain capitalization information associated with the obtained text 114. Again, referring back to the example provided above, if the only text 104 in the document 102 is the phrase "See Spot Run!"; then the document-level non-normalized character index 216 would include the non-normalized characters 218 "See Spot Run!".

The paragraph-level indices 202 function identically to the document-level indices 200. The only difference being that, in this example, a normalized word index 220, non-normalized word index 224, normalized character index 228, and non-normalized character index 232 are provided for each paragraph in the document 102. Thus, if all of the text 104 in the document 102 is broken up into two paragraphs, then, in this example, there would be eight (8) separate paragraph level indices 202 created for that document 102. These paragraph level indices may exist in addition to any document-level indices 200 that are also generated for a given document 102. While the foregoing discussion describes indices being on either a document-level or a paragraph level, those having ordinary skill in the art will appreciate that indices could suitable be provided on any desirable level of abstraction (e.g., on a sentence-level).

The index engine 128 is able to identify which portions of the obtained text 114 belong to which paragraphs within the document 102 according to unique identifiers assigned to each paragraph in the document. In one embodiment, the word processing software used to create the document 102 includes a function that allows each paragraph to be assigned a unique identifier. That is, the word processing software that the document 102 is open in is able to provide the architecture for the unique identifier, while the controller 106, for example, is capable of assigning a unique value to each paragraph. For example, a unique new sequential value may be assigned to each new paragraph in a document 102 by apparatus 100. Thus, if the document 102 originally included five (5) paragraphs worth of text 104, apparatus 100 would be operative to assign five unique Ids, one to each paragraph worth of text (e.g., ID numbers 1-5). Then, if a new paragraph was added, this new paragraph could be assigned its own unique ID (e.g., ID number 6). Apparatus 100 is operative to keep track of the unique IDs assigned to each paragraph. In this manner, apparatus 100 may instruct the word processing program to change the view within its user interface to depict, for example, the first instance of a Defined Term when that defined term has been selected by a user from user interface 132.

Figure 4:
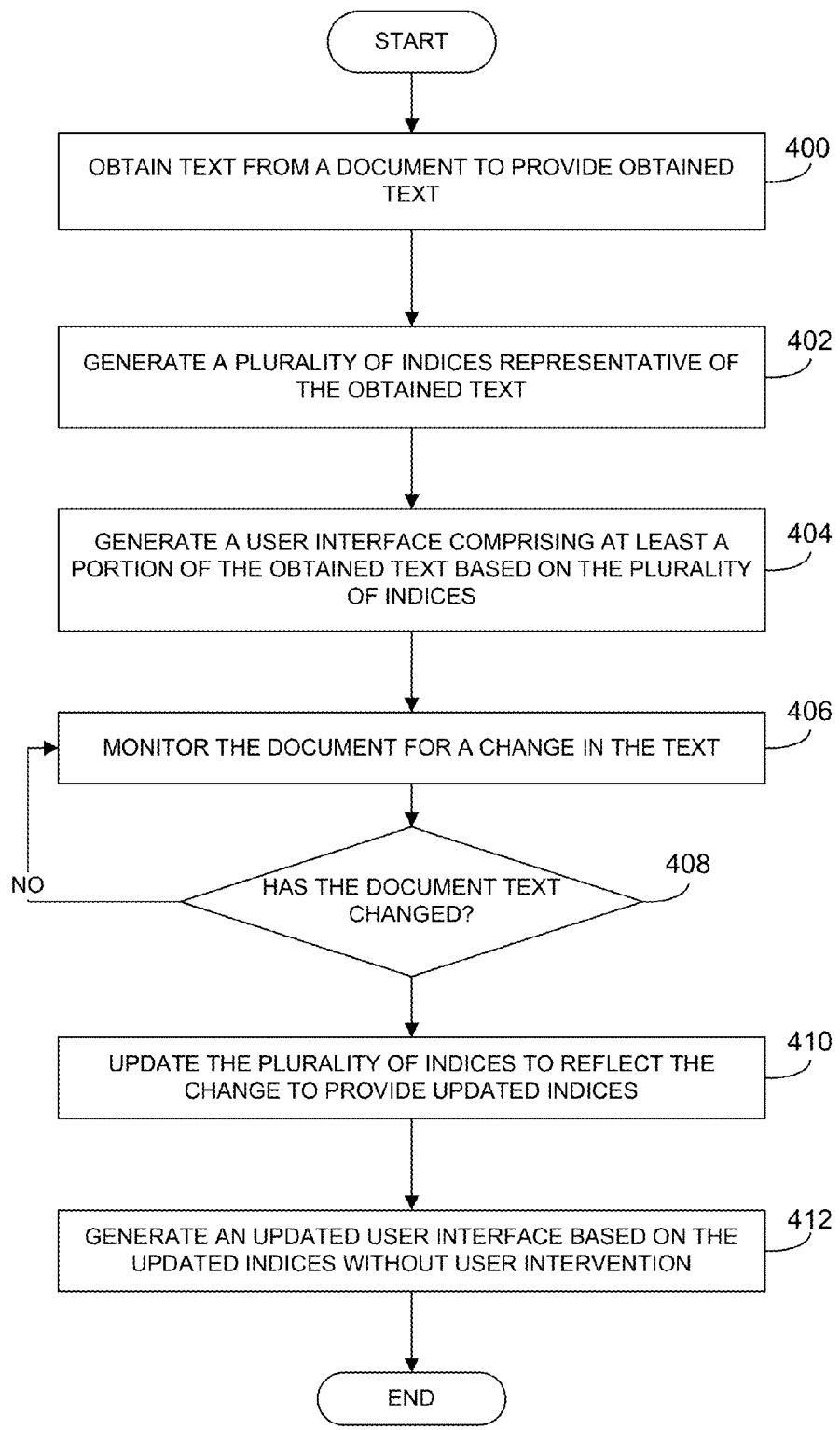
FIG. 4 is a flowchart generally depicting one example of a method for analyzing a document in accordance with the present disclosure.

Referring now to FIG. 4, a flowchart illustrating one example of a method for analyzing a document in accordance with the present disclosure is provided. While the apparatus 100 is a form for implementing the processing described herein, those having ordinary skill in the art will appreciate that other, functionally equivalent techniques may be employed. For example, as known in the art, some or all of the functionalities implemented via executable instructions may also be implemented using firmware and/or hardware devices such as application specific integrated circuits (ASICs), programmable logic arrays, state machines, etc. Further still, other implementations of the apparatus 100 may include a greater or lesser number of components than those illustrated. Once again, those of ordinary skill in the art will appreciate the wide number of variations that may be used is this manner.

Beginning at block 400, text is obtained from a document to provide obtained text. At block 402, a plurality of indices representative of the obtained text are generated. At block 404, a user interface is generated. The user interface includes at least a portion of the obtained text based on the plurality of indices that were generated at block 402. At block 406, the document is monitored to detect a change in the text of the document. At block 408, a determination is made as to whether the document text has changed. If it is determined that the document text has not changed, then the process returns to block 406. However, if it is determined that the text has changed, then the method proceeds to block 410. At block 410, the plurality of indices are updated to reflect the change in the text to provide updated indices. Finally, at block 412, an updated user interface is generated based on the updated indices without user intervention.

Figure 5:
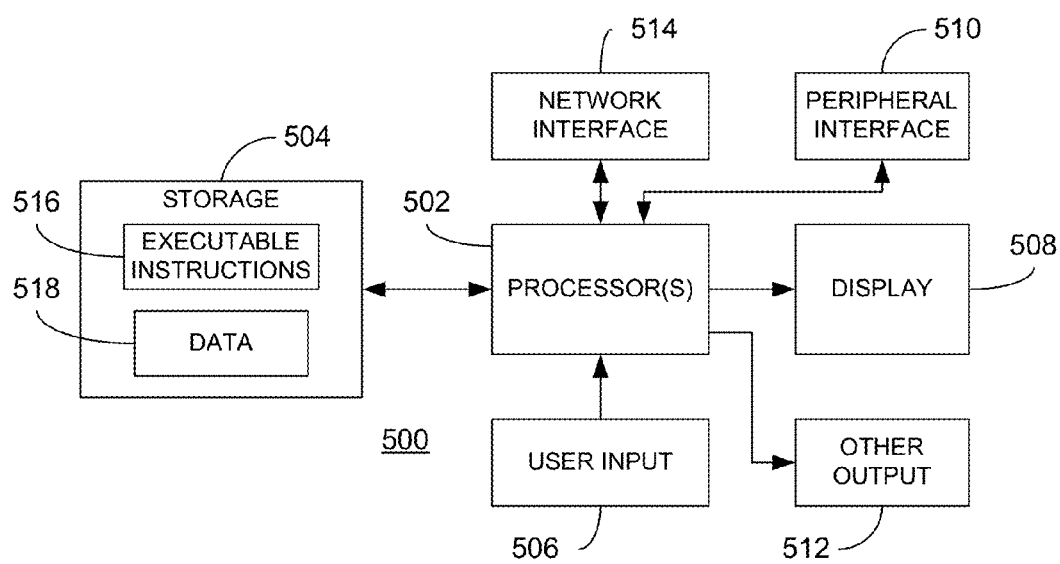
FIG. 5 is a block diagram generally depicting one example of a processing device that may be used to implement the teachings of the present disclosure.

FIG. 5 illustrates a representative processing device 500 that may be used to implement the teachings of the instant disclosure. The device 500 may be used to implement, for example, one or more components of the apparatus 100, as described in greater detail above. Regardless, the device 500 comprises a processor 502 coupled to a storage component 504. The storage component 504, in turn, comprises stored executable instructions 516 and data 518. In an embodiment, the processor 502 may comprise one or more of a microprocessor, microcontroller, digital signal processor, co-processor or the like or combinations thereof capable of executing the stored instructions 516 and operating upon the stored data 518. Likewise, the storage component 504 may comprise one or more devices such as volatile or nonvolatile memory including but not limited to random access memory (RAM) or read only memory (ROM). Further still, the storage component 504 may be embodied in a variety of forms, such as a hard drive, optical disc drive, floppy disc drive, etc. Processor and storage arrangements of the types illustrated in FIG. 5 are well known to those having ordinary skill in the art. In one embodiment, the processing techniques described herein are implemented as a combination of executable instructions and data within the storage component 504.

As shown, the device 500 may comprise one or more user input devices 506, a display 508, a peripheral interface 510, other output devices 512 and a network interface 514 in communication with the processor 502. The user input device 506 may comprise any mechanism for providing user input (such as inputs selecting a term such as "accountant" from the user interface 132 as described above) to the processor 502. For example, the user input device 506 may comprise a keyboard, a mouse, a touch screen, microphone and suitable voice recognition application, or any other means whereby a user of the device 500 may provide input data to the processor 502. The display 508, may comprise any conventional display mechanism such as a cathode ray tube (CRT), flat panel display, or any other display mechanism known to those having ordinary skill in the art. In an embodiment, the display 508, in conjunction with suitable stored instructions 516, may be used to implement the user interface 132. Implementation of a graphical user interface in this manner is well known to those having ordinary skill in the art. The peripheral interface 510 may include the hardware, firmware and/or software necessary for communication with various peripheral devices, such as media drives (e.g., magnetic disk or optical disk drives), other processing devices or any other input source used in connection with the instant techniques. Likewise, the other output device(s) 512 may optionally comprise similar media drive mechanisms, other processing devices or other output destinations capable of providing information to a user of the device 500, such as speakers, LEDs, tactile outputs, etc. Finally, the network interface 514 may comprise hardware, firmware and/or software that allows the processor 502 to communicate with other devices via wired or wireless networks, whether local or wide area, private or public, as known in the art. For example, such networks may include the World Wide Web or Internet, or private enterprise networks, as known in the art.

While the device 500 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 500 may include a greater or lesser number of components than those illustrated. Once again, those of ordinary skill in the art will appreciate the wide number of variations that may be used is this manner. Further still, although a single processing device 500 is illustrated in FIG. 5, it is understood that a combination of such processing devices may be configured to operate in conjunction (for example, using known networking techniques) to implement the teachings of the instant disclosure.

Figure 6:
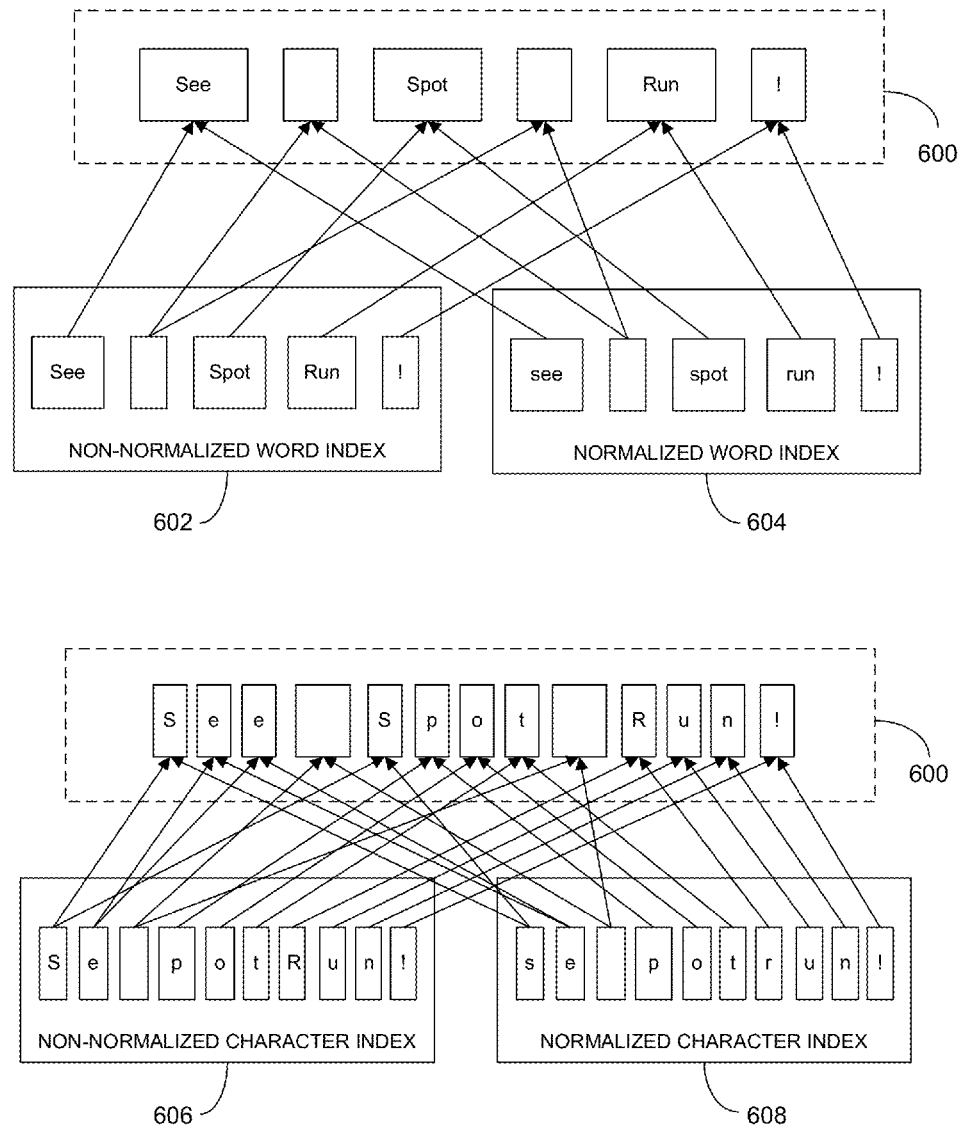
FIG. 6 illustrates one example of a plurality of indices representative of obtained text.

FIG. 6 illustrates one example of a plurality of indices representative of obtained text. In the illustrated example, text 600 represents text that is parsed from a document, such as document 102. For purposes of simplicity, FIG. 6 assumes that the document containing the text only includes a single paragraph worth of text, and that the single paragraph worth of text only includes a single sentence stating "See Spot Run!". Thus, indices 602-608 could represent document-level indices or paragraph-level indices equally well in this example (because there is only a single, one-sentence paragraph in this example).

The top portion of FIG. 6 depicts one example of how the text 600 may be stored in word indices in line with the teachings of the instant disclosure. Non-normalized word index 602 includes five entries: (1) the word "See"; (2) a space; (3) the word "Spot"; (4) the word "Run"; and (5) an exclamation point. Because the non-normalized word index 602 is not normalized, the words "See," "Spot," and "Run" each retain their capitalization. In addition, the punctuation mark "!" and the space are both treated as words for the purposes of the non-normalized word index 602. Another notable feature of the non-normalized word index 602 is its use of pointers. Rather than storing a separate entry for each instance of the same word in text 600, index 602 utilizes pointers to store a single instance of each word and a pointer (i.e., location information) identifying where other occurrences of that word exist within the document (or paragraph, depending on whether the index is a document-level index or a paragraph-level index). Thus, only a single instance of the space is stored in the non-normalized index 602. The non-normalized word index 602 also stores a pointer indicating that the text 600 includes another space in between the words "Spot" and "Run".

Similarly, normalized word index 604 includes five entries, treats spaces and punctuation marks as words, and uses pointers to represent multiple instances of the same word. The key difference between the normalized word index 604 and the non-normalized word index 602 is that the normalized word index 604 does not store any capitalization information associated with the text 600.

The bottom portion of FIG. 6 depicts one example of how the same text 600 discussed above may be stored in character indices in line with the teachings of the instant disclosure. Non-normalized character index 606 includes ten entries: (1) the capitalized letter "S"; (2) the lower case letter "e"; (3) a space; (4) a lower case letter "p"; (5) a lower case letter "0"; (6) a lower case letter "t"; (7) an upper case letter "R"; (8) a lower case letter "u"; (9) a lower case letter "n"; and (10) an exclamation point. Because the non-normalized character index is not normalized, the letters "S," and "R" retain their capitalization. In addition, the punctuation mark "!" and the space are both treated as characters for the purposes of the non-normalized character index 606. Similar to the word indices 602, 604 discussed above, the non-normalized character index 606 also makes use of pointers to store a single instance of each character and a pointer identifying where other occurrences of that character exist within the document (or paragraph, as the case may be). Normalized character index 608 is similar to the non-normalized character index 606 except that capitalization information associated with the text 608 is not retained.

Figure 7:
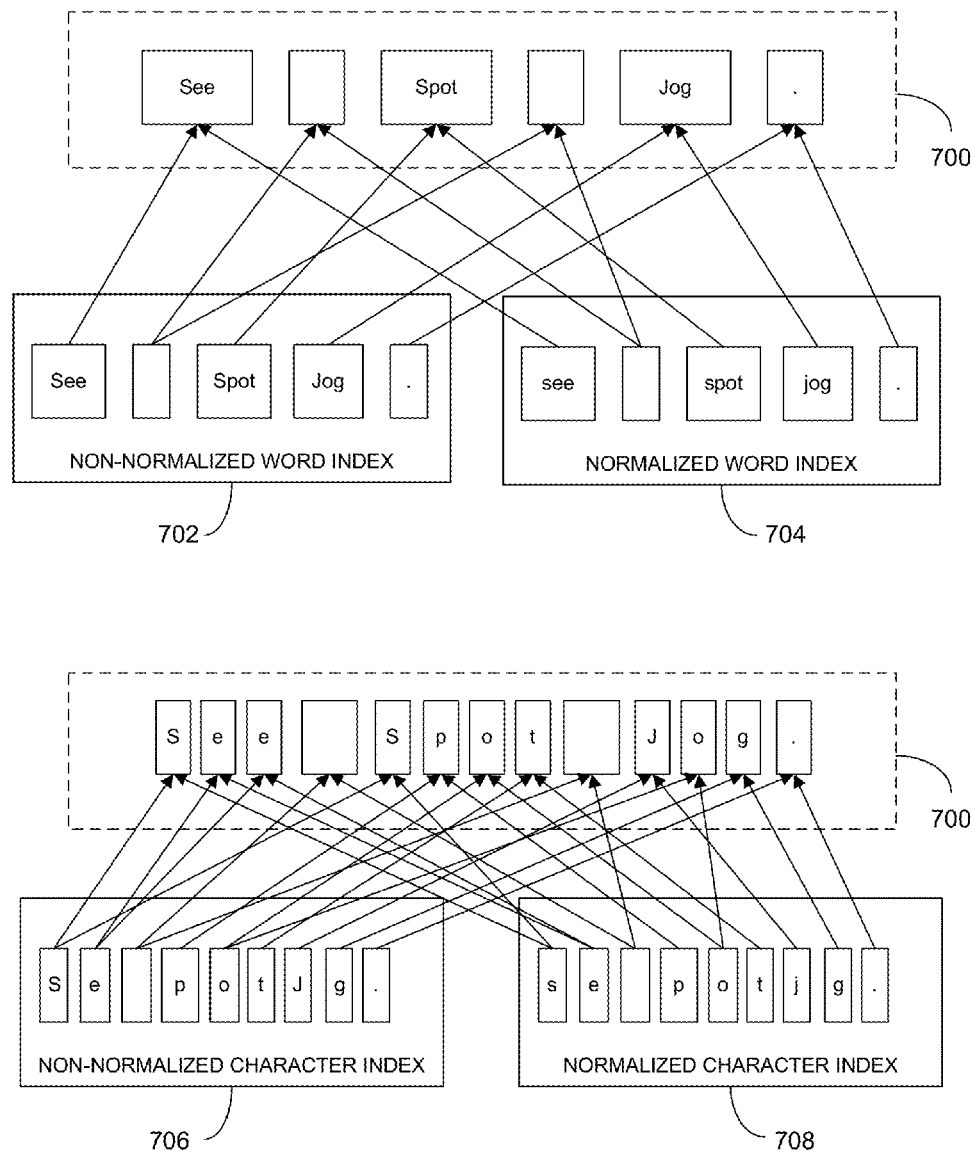
FIG. 7 illustrates another example a plurality of indices representative of obtained text following a change to the text.

FIG. 7 illustrates a modified version of the plurality of indices presented in FIG. 6 after the text 600 of FIG. 6 has been changed. That is to say, FIG. 7 assumes that a user has modified the original sentence discussed in FIG. 6 from "See Spot Run!" to "See Spot Jog.". Accordingly, the indices representing the modified text 700 have changed as well. For example, the word "Run" present in non-normalized word index 602 has been replaced by the word "Jog" in non-normalized word index 702. Similarly, the word "run" in normalized word index 604 has been replaced by the word "jog" in normalized word index 704. In addition, the exclamation points present in word indices 602, 604 have been replaced by periods in word indices 702, 704.

With regard to the character indices of FIG. 7, it is clear that the four entries for "R," "u," "n," and "!" that were present in the non-normalized character index 606 of FIG. 6 have been replaced by the three entries "J," "g," and "." in the non-normalized character index 706 of FIG. 7. In addition, non-normalized character index 706 includes an additional pointer from the letter "o". Specifically, because the text 700 of FIG. 7 now has two "o"s, non-normalized character index 706 includes an additional pointer from the letter "o" when compared with non-normalized character index 606 of FIG. 6. This additional pointer indicates that text 700 also includes the letter "o" between the letters "j" and "g". Normalized character index 708 stores text 700 in a similar fashion to non-normalized character index 706, except capitalization information associated with the text has not been retained.

As stated earlier, the user interface 132 may operate in additional modes beyond the Defined Terms operating mode previously described. One such operating mode is the Inconsistent Phrases operating mode. In one example of the Inconsistent Phrases operating mode, pattern engine 130 includes executable instructions or modules that enable the pattern engine 130 to analyze a document and identify patterns. Generally speaking, the Inconsistent Phrases operating mode includes functionality such that a document is analyzed and phrases are identified and presented to assist in the correction of inconsistencies in the document.

Figure 8:
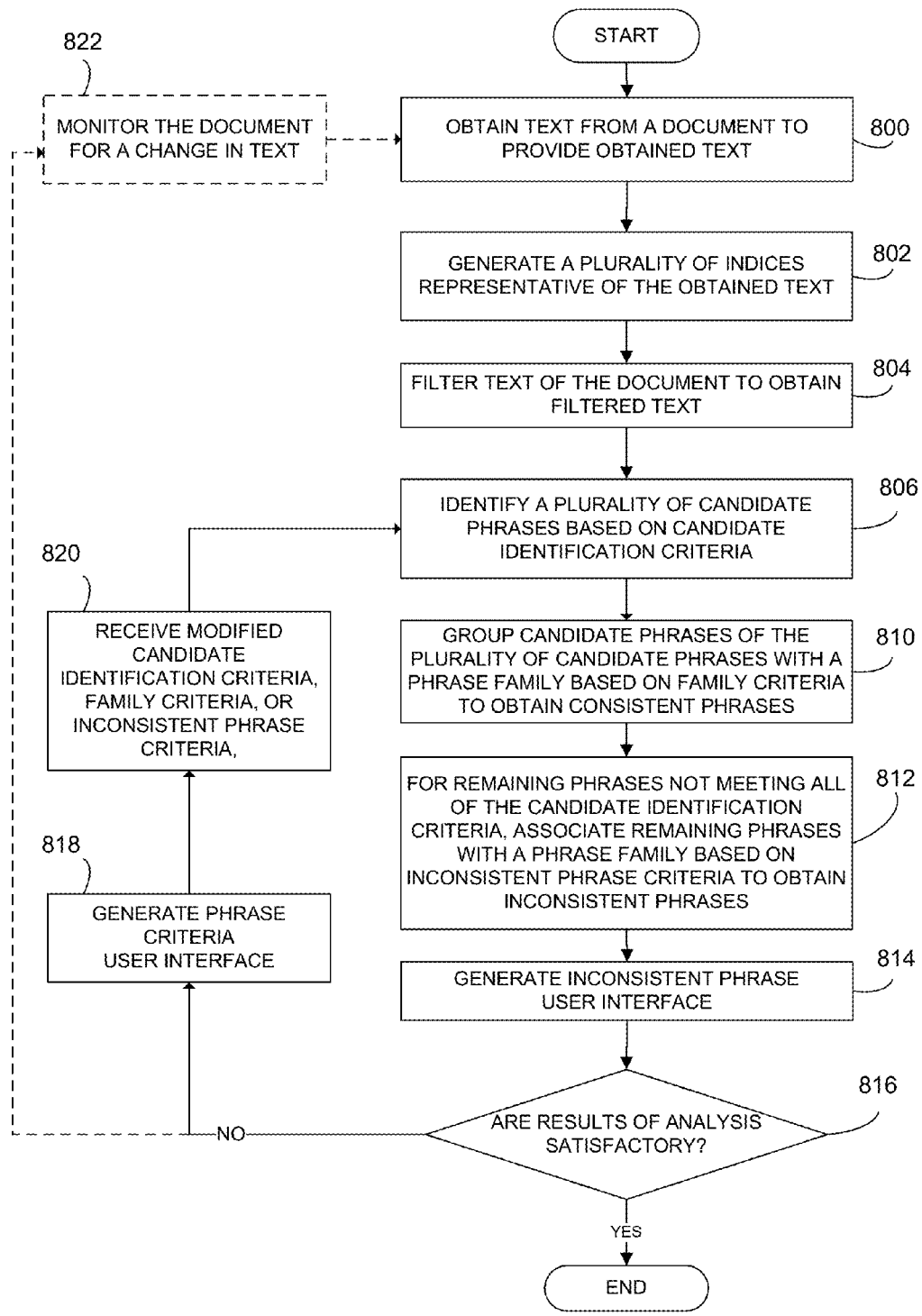
FIG. 8 is a flowchart generally depicting an example of a method for analyzing a document in accordance with the present disclosure.

FIG. 8 is a flowchart illustrating one example of a method that can be performed as part of the Inconsistent Phrases operating mode. Additionally FIG. 5 shows one example of an apparatus 100 in a form for implementing the processing described herein. Those having ordinary skill in the art will appreciate that other, functionally equivalent techniques may also be employed. For example, as known in the art, some or all of the functionalities implemented via executable instructions may also be implemented using firmware and/or hardware devices such as application specific integrated circuits (ASICs), programmable logic arrays, state machines, etc. Further still, other implementations of the apparatus 100 may include a greater or lesser number of components than those illustrated. Once again, those of ordinary skill in the art will appreciate the wide number of variations that may be used is this manner.

Referring now back to one example method of the Inconsistent Phrases operating mode, at step 800 of FIG. 8, text is obtained from a document to provide obtained text and at block 802 a plurality of indices representative of the obtained text are generated. As can be seen, the processing previously described and the indices, including the multiple levels, the normalized and non-normalized indicies, can be used to assist in the document analysis in the Inconsistent Phrases operating mode. At step 804, the text of the document is filtered to obtain filtered text. In this embodiment, the text (or obtained text, as may be the case) is analyzed and some elements of the text are eliminated from consideration and analysis as hereafter will be described. The text is filtered according to filtering criteria. Filtering criteria are characteristics, either predetermined or user-modifiable, that reduce the content of the text to be analyzed. Some characteristics that may be used as filtering criteria are certain punctuation, text spacing, or common reoccurring words (e.g., the word "it" may be filtered because it occurs more than 200 times in a document). Other filtering criteria may be used, as are known to those of ordinary skill in the art, to reduce the amount of text that will be considered in later steps. After the filtering criteria are applied against the text of the document, filtered text is obtained and may be stored for later analysis.

At step 806 of FIG. 8, a plurality of candidate phrases are identified based on candidate identification criteria. Phrases, as used herein, mean one or more words, expressions or grouping of characters that appears in a document. Candidate phrases are phrases that meet certain requirements or characteristics and that will be analyzed further by the processes of the Inconsistent Phrases operating mode. Candidate identification criteria are the requirements or characteristics used to separate candidate phrases from other phrases in a document. In one example, candidate identification criteria may include the frequency that a phrase appears in a document, a number of words in a phrase, and a number of characters in the phrase. Minimum, maximum, or a range of a characteristic may serve as a candidate identification criteria but other types of characteristics or limits of a characteristics may be used as well.

In one embodiment, pattern engine 130, in the Inconsistent Phrases operating mode, identifies candidate phrases by analyzing the content of the document to find phrases that meet the candidate identification criteria. Each occurrence of the phrase is collected and information about the candidate phrase occurrence is stored for later use. In an embodiment, the processing to identify phrases that meet the candidate identification criteria may be performed at substantially the same time as the indexing operations described above. That is, as the document is indexed, the candidate identification criteria may also be assessed to identify phrases meeting the criteria. Of course, it is also possible to separate these operations such that, for example, the candidate identification criteria are assessed after the indexing has been completed.

At step 810, the candidate phrases of the plurality of candidate phrases are grouped with a phrase family based on family criteria to obtain consistent phrases. A phrase family is a grouping of phrases that meets the characteristics or requirements as defined in the family criteria and thus considered to be substantially similar, if not always identical, so as to be considered part of the same "family" of phrases. Family criteria can include almost any characteristic or requirement of a phrase. Examples of family criteria include the number of common words between phrases and the proximity between the words that two phrases may have in common. For example, the proximity between common words in phrases can be measured by comparing the words of two phrases and determining both the overall number of common words between the two phrases and also determining the number of words that are not common between the two phrases. In this example, the proximity between the common words can be represented as a ratio of the number of words that are not common between the phrases to the number of common words. Thus, the smaller the ratio, the greater the likelihood that the common words are proximate to each other. Other family criteria, such as, but not limited to, the number of common characters, the location of characters, the order of the common words and other measurements and characteristics, as known to one of ordinary skill in the art, can be used.

In an embodiment, families of phrases are identified by assessing the candidate phrases in the order in which they are found in the document. Thus, the first candidate phrase is compared to the next occurring candidate phrase in the document based on the family criteria. For example, the phrase "Acquired Company's Assets" (occurring, in this example, 10 times in the document) and the phrase "Acquired First Company's Assets" (occurring, in this example, 8 times in the document) are compared based on the family criteria. If, according to the family criteria, these two phrases are deemed sufficiently similar, then they are combined into a single phrase family consisting, in this case, into a single phrase family consisting of 18 occurrences. In one embodiment, a phrase family is defined by that candidate phrase that occurs first in the document. In this embodiment, the candidate phrase that defines the phrase family (i.e., is listed as the first phrase in the family and is used to identify the phrase family in a user interface as will be explained later) is referred to as the "lead phrase." In another embodiment, the lead phrase is the phrase in the phrase family with the highest frequency of occurrence in the document. Other phrases with different characteristics, as known to those of ordinary skill in the art, can also be identified as the lead phrase for a phrase family.

Once a family of phrases has been defined, it may also be included in the process of comparisons such that it is compared with other candidate phrases or other, previously identified phrase families. When comparing based on a phrase family having constituent phrases that are similar but not identical, the lead phrase for that phrase family may be used as the basis for comparing that phrase family with other candidate phrases and/or phrase families according to the family criteria. This process of comparing candidate phrases and/or families to determine consistent phrases continues until all candidate phrases have been analyzed and grouped into a phrase family.

Referring back to step 810, in one example, candidate phrases of the plurality of candidate phrases are compared with one another (or other phrase families) based on the family criteria and grouped into one or more phrase families. As can be appreciated by one of ordinary skill in art, as the family criteria are more restrictive, the number of phrases that are grouped into any one family may become fewer and less of the candidate phrases are grouped. As the family criteria are less restrictive, the converse becomes true (i.e., the number of phrases that are grouped into any one family may increase and more candidate phrases are grouped). The grouped candidate phrases, at the conclusion of the processing of step 810 are called consistent phrases. The consistent phrases may then be stored for later processing.

At step 812, for remaining phrases not meeting all of the candidate identification criteria, at least one of the remaining phrases are associated with a phrase family based on inconsistent phrase criteria to obtain inconsistent phrases. Remaining phrases are those phrases in the document that meet some but not all of the candidate identification criteria discussed earlier. In one example, remaining phrases are those phrases that meet the number of words criteria and the number of characters criteria but not the number of occurrences criteria. In this example, the phrases meeting the number of words criteria and the number of characters criteria are identified as remaining phrases in the document. Optionally, the remaining phrases can be stored for later access and use.

Referring back to step 812, the remaining phrases are then analyzed and compared against the consistent phrases based on inconsistent phrase criteria. Inconsistent phrase criteria are characteristics or requirements used to identify phrases that are similar enough to a consistent phrase to warrant identification because they may have been drafted in error or include an unintentional variation from other phrases in a document. That is, an inconsistent phrase is associated with an otherwise consistent phrase (i.e., a phrase or lead phrase in a phrase family) in the sense that it is flagged as a potential error or mistake that might benefit from a user assessing whether there is, in fact, an error or mistake. Inconsistent phrase criteria, in one example, may include characteristics or requirements similar to those discussed above with regards to family criteria such as the number of common words and the proximity of words that two phrases may have in common. Other characteristics or requirements of phrases may equally be used.

The remaining phrases, in this example, are compared against the consistent phrases grouped earlier based on the inconsistent phrase criteria. While the remaining phrases can be compared against any one or all of the consistent phrases, in one example, the remaining phrases are compared against the phrase in each phrase family identified as the lead phrase. If the remaining phrase meets the requirements of the inconsistent phrase criteria when compared against the consistent phrase, the remaining phrase is associated with the same phrase family as the consistent phrase. This process continues until all remaining phrases have been analyzed. In one example, each remaining phrase is analyzed and if meeting the inconsistent phrase criteria when compared against a consistent phrase, the remaining phrase is associated with a phrase family and is considered an inconsistent phrase. Further in this example, if a remaining phrase does not meet the inconsistent phrase criteria when compared against a consistent phrase, the remaining phrase is removed from further consideration and is not considered an inconsistent phrase. Other processing may also be used in other embodiments such as the storing of non-associated remaining phrases for display or further consideration.

In other examples where a remaining phrase does not meet the requirements of the inconsistent phrase criteria when compared against a candidate phrase, as discussed above, the remaining phrase (un-associated with a phrase family at this point) can be associated with a new phrase family that is created such that the remaining phrase is still identified as an inconsistent phrase via the methods later described. In other examples, remaining phrases are associated with phrase families that most closely resemble the remaining phrases despite not meeting the requirements of the inconsistent phrase criteria. Other methods of associating the remaining phrases known to those of ordinary skill in the art may also be used.

Figure 9:
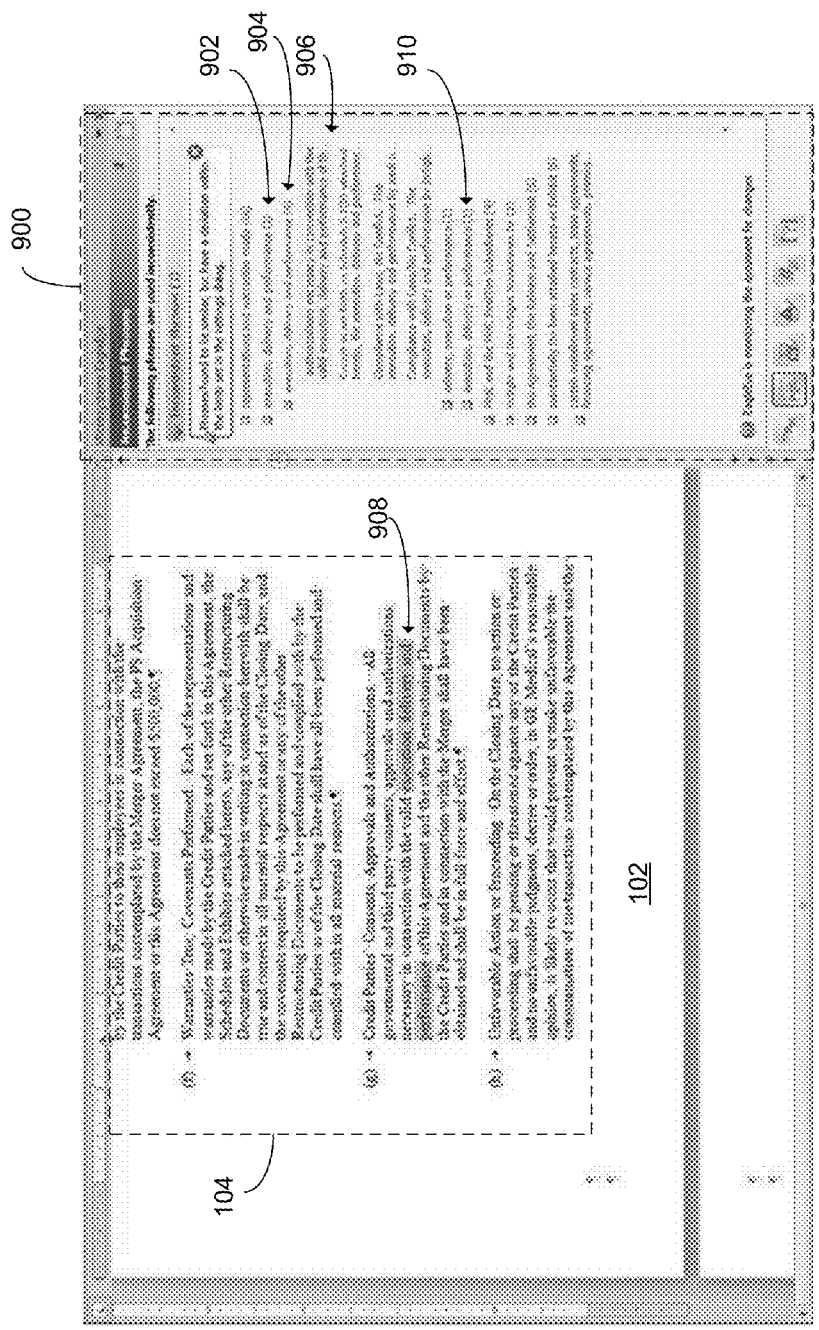
FIG. 9 illustrates one example of a user interface that may be generated in accordance with the present disclosure.

At step 814, an inconsistent phrase user interface is generated. The inconsistent phrase user interface 900 is an example of user interface 132 for use with the Inconsistent Phrases operating mode. One embodiment of inconsistent phrase user interface 900 is illustrated in each of FIGS. 9 and 10. As can be seen in FIG. 9, in this example, inconsistent phrase user interface 900 is provided as part of a larger user interface for a word processing program in which the document 102, including text 104, is visible. Alternatively, the inconsistent phrase user interface 900 can be presented separate from, but adjacent to, the word processing program or independently from and without the word processing program.

Figure 10:
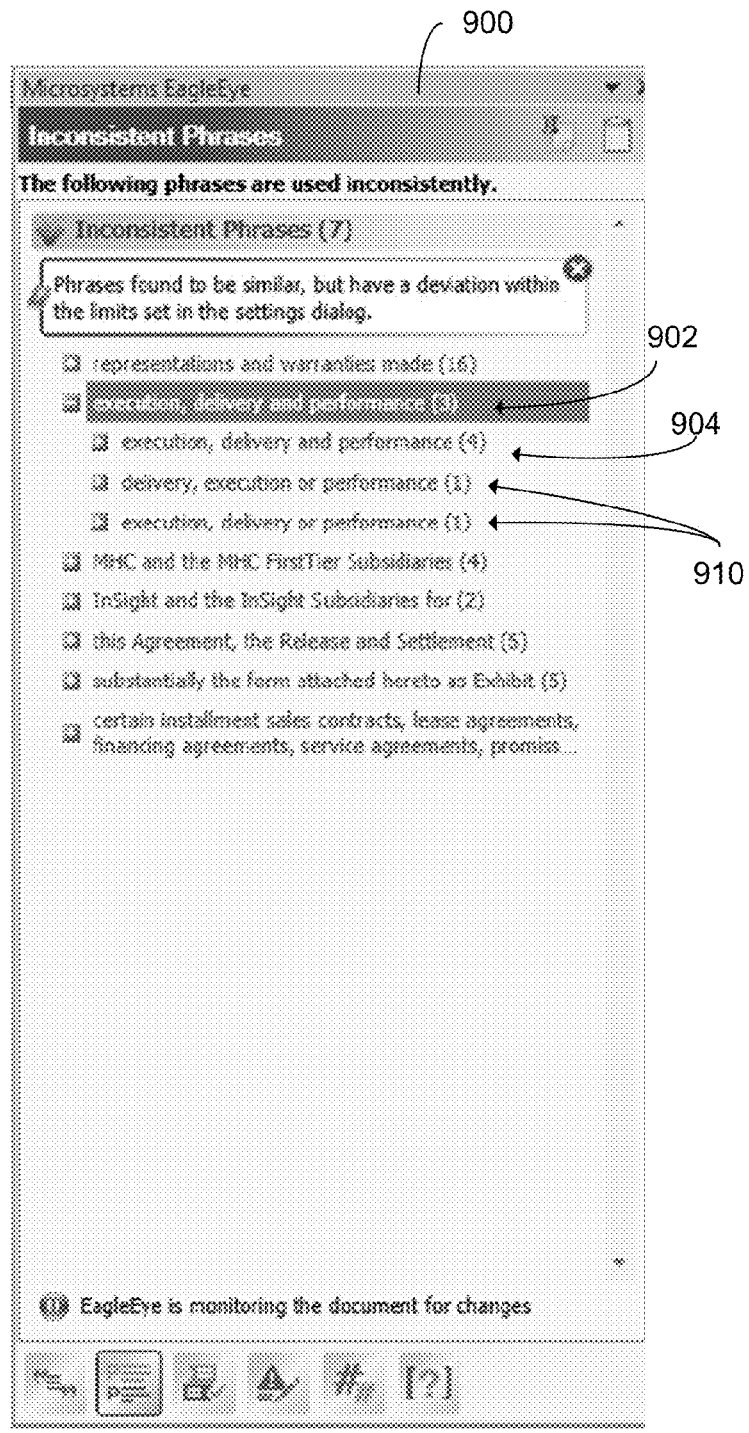
FIG. 10 illustrates another example of a user interface that may be generated in accordance with the present disclosure.

FIG. 10 illustrates an example of inconsistent phrase user interface 900 without a word processing program display window. In this example, inconsistent phrase user interface 900 includes a representation of a phrase family 902. The representation of phrase family 902 includes the functionality to additionally view the consistent phrase(s) grouped into phrase family 902. If a user clicks a mouse button while placing a pointer over the icon to the left of phrase family 902, consistent phrase 904 becomes visible. In addition to the display of consistent phrase 904, in this example, inconsistent phrase user interface 900 also displays inconsistent phrases 910. In this example, additional information functionality may be included on inconsistent phrase user interface 900 such as the number of unique phrases grouped or associated with a phrase family, the number of consistent phrases, and the number of inconsistent phrases. Other information and functionality may be included as are known to those of ordinary skill in the art.

For example, FIG. 9 shows further information that may be provided in inconsistent phrase user interface 900. In addition to a representation of phrase family 902, and representations of consistent and inconsistent phrases 904 and 910, inconsistent phrase user interface 900 can additionally include a representation of phrase text 906 that includes the consistent or inconsistent phrase 904, 910. This information can be useful for the user such that the context of the phrase can be easily viewed. Inconsistent phrase user interface 900 can additionally provide functionality to interact with document 102 and its display in a word processing program. In one example, if a user places a pointer over or clicks on the representation of phrase text 906 in inconsistent user interface 900, the corresponding text in document 102 can be identified by selecting or otherwise indicating the corresponding text as shown by indicated text 908. Other interactions and functionality known to those of ordinary skill the art may additionally be provided in inconsistent phrase user interface 900.

Referring back to FIG. 8, at step 816, a decision point may be included in one method of Inconsistent Phrases operating mode in which a determination is made whether or not the processing and analysis performed to this point has provided an analysis of the document in which the results are satisfactory for a user's needs. As can be appreciated, a user, at any given time during the drafting of a document, may want loose evaluation criteria to identify more consistent and inconsistent phrases or, when a document is being finalized, may want to use more stringent criteria to result in a more pointed analysis. No matter the needs of the user or the stage in the drafting of a document, the Inconsistent Phrases operating mode provides functionality to aid the user in the drafting process. If the results of the analysis are satisfactory, which may be determined, for example, in response to viewing the results of the analysis as presented via an inconsistent phrase user interface, the method concludes. If the analysis has not provided the desired information, such as, for example, not identifying enough consistent and inconsistent phrases, or the phrases are grouped in phrase families in an unanticipated or unhelpful way, the Inconsistent Phrases operating mode can supply functionality to modify the results.

One way that the Inconsistent Phrases operating mode can address a circumstance in which the results of the analysis are unsatisfactory is via processing that may occur when a change to the text of the document is made. At step 822, the document is monitored for a change in text. In one embodiment, the controller(s) 106 may poll the word processing software or receive a change event notification, as described earlier, indicating that a change to the text has been made. In response to the change in text, and without user intervention, the processing as earlier described can be performed again based on the changed text. In this manner, new candidate phrases, revised phrase families, revised consistent phrases and modified inconsistent phrases can be identified and generated for display via the inconsistent phrases user interface 900. FIG. 8 shows one example wherein the flow of steps is such that all the steps as previously described are re-performed in response to the change in text, however, only a sub-set or portion of the steps and processes may be performed. Additionally, as described earlier, the Inconsistent Phrases operating mode can be monitoring for changes to the text of the document and updating the Inconsistent Phrases user interface continuously and without user intervention as the document being analyzed is being modified or changed.

In another example, all the steps of FIG. 8 are not performed in response to a change in text. In the example, when a change to the text is made, the Inconsistent Phrases operating mode identifies a portion of the document that has been changed. For example, the paragraph of the document that has been changed can be identified. In response, the Inconsistent Phrases operating mode can then revise the display of the consistent phrases and the inconsistent phrases to indicate that a revision to the portion of the document including the phrase has been made. In one example, the consistent phrases and the inconsistent phrases found in the modified and identified paragraph are removed from display on the inconsistent phrases user interface. Other methods of indicating a revision to the document such as different colors, icons, or other indicators known to those of ordinary skill in the art may also be used. In this example, the indication of the revision to a portion of the document including a consistent or inconsistent phrase can be useful to a document drafter to track the correction of a document. Further functionality can also be provided in this example whereby the user can re-analyze the document. Consistent and inconsistent phrases, in one example, can be re-analyzed and re-displayed after receiving an indication of the user's desire for re-analysis by a user input device. A control button, keystroke, or other control mechanism, as known to those of ordinary skill in the art, can be used to facilitate this functionality. Upon receiving an indication of a user's desire for re-analysis, all or a subset of the steps shown in FIG. 8 can be performed.

Figure 11:
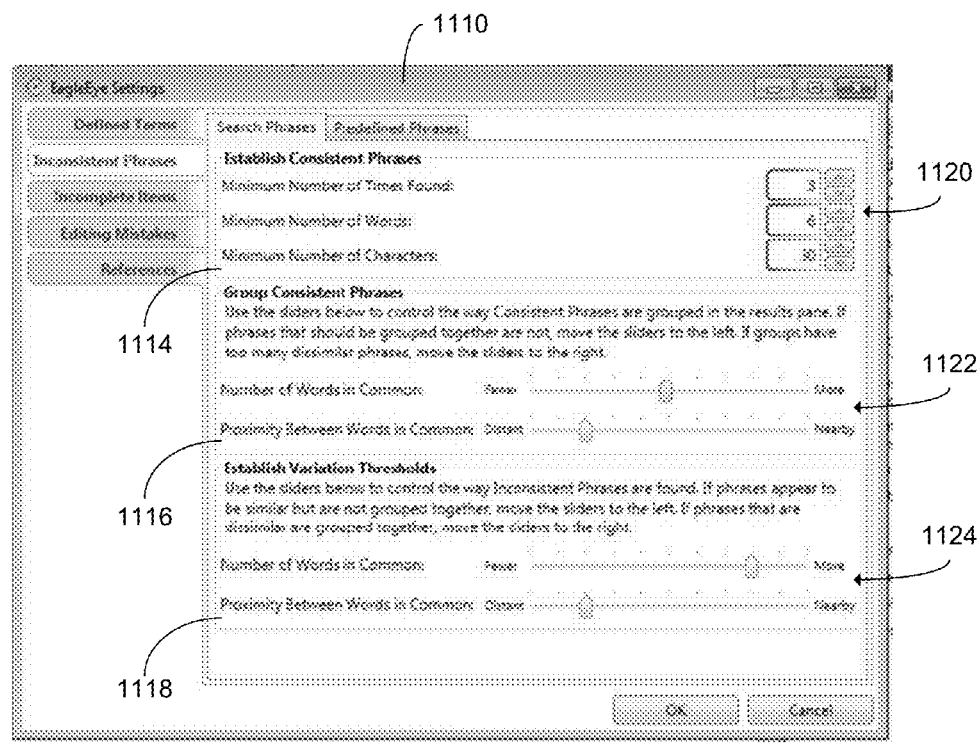
FIG. 11 illustrates yet another example of a user interface that may be generated in accordance with the present disclosure.

Another way that the Inconsistent Phrases operating mode can address a circumstance in which the results of the analysis are unsatisfactory is shown through the modification of the different phrase criteria. At step 818, a phrase criteria user interface is generated. Phrase criteria user interface 1100 is a user interface that enables various criteria used in the analysis of the document to be varied or adjusted. Any user interface may be used as are known to those of ordinary skill in the art. One example phrase criteria user interface 1100 is shown in FIG. 11. In this example, phrase criteria user interface 1100 is presented as a window on a display. Phrase criteria user interface 1100 includes candidate identification control 1114, family criteria control 1116, and inconsistent phrase criteria control 1118. Candidate identification control is a mechanism that allows for the adjustment of the candidate identification criteria. As can be seen in this example, candidate identification control 1114 includes the display of (1) minimum number of times found; (2) minimum number of words; and (3) minimum number of characters. Next to each of these candidate identification criteria is a text box and control buttons 1120 that allows the candidate identification criteria to be changed or adjusted. This adjustment enables more or less candidate phrases to be identified during processing. Other controls and display techniques can be used in the candidate identification control 1114 such as, icons, images or text coupled with text boxes, radio buttons, slider bars, or other representations or controls known to those of ordinary skill in the art.

In one example, as seen in FIG. 11, phrase criteria user interface 1110 includes family criteria control 1116. Similarly to the example candidate identification control 1114 discussed above, family criteria control 1116 is a mechanism that enables the adjustment of family criteria. In this example, family criteria control 1116 includes family criteria: (1) the number of words in common; and (2) the proximity between words in common. Next to these two example family criteria are slider controls 1122. As can be appreciated, slider control 1122 can be adjusted, independently of each other in this example, such that each family criteria can be modified according to the needs of a user. Other controls and display techniques can be used in the candidate identification control 1114 such as, icons, images or text coupled with text boxes, radio buttons, command buttons, or other representations or controls known to those of ordinary skill in the art.

Phrase criteria user interface 1110 additionally may include, as shown in this example, inconsistent phrase criteria control 1118. Inconsistent phrase criteria control 1118 allows for the adjustment of inconsistent phrase criteria. In this example, inconsistent phrase criteria control includes inconsistent phrase criteria: (1) the number of words in common; and (2) the proximity between words in common. Next to these two example inconsistent phrase criteria are slider controls 1124. As these slider bars are moved to the left or to the right, the associated inconsistent phrase criteria are modified to be less or more restrictive, respectively. Other controls and display techniques can be used in the candidate identification control 1114 such as, icons, images or text coupled with text boxes, radio buttons, command buttons, or other representations or controls known to those of ordinary skill in the art.

Referring back to FIG. 8, at step 820, modified candidate identification criteria, family criteria, or inconsistent phrase criteria is received. In this example, in response to the display of phrase criteria user interface 1110, any one of the previously listed criteria can be modified. This modified criteria can then be received and reapplied against the document. Through this functionality, different candidate phrases can be identified, the candidate phrases can be grouped based on different family criteria and remaining phrases can be associated with phrase families based on different inconsistent phrase criteria. As can be appreciated, the adjustment of the various criteria can be made iteratively until the analysis of the document is satisfactory to a user.

The steps of the exemplary method of the instant disclosure have been described in the sequence shown in FIG. 8. The steps, however, can be performed in different orders than that previously described. For example, the generation of phrase criteria user interface at step 818 and the receipt of modified criteria at step 820 can be performed before the initial analysis of the document in the Inconsistent Phrases operating mode. Other variations of the described method, as known to those of ordinary skill in the art, may also be applied.

The above detailed description and the examples described therein have been presented for the purposes of illustration and description only and not by way of limitation. It is therefore contemplated that the present disclosure cover any and all modifications, variations or equivalents that fall within the spirit and scope of the basic underlying principles disclosed above and claimed herein.

What is claimed is:

1. In at least one processing device configured to perform electronic document analysis of a document, a method for generating an inconsistent phrase user interface, the method comprising:
   identifying, by the at least one processing device, a plurality of candidate phrases in the document based on candidate identification criteria;
   grouping, by the at least one processing device, candidate phrases of the plurality of candidate phrases with a phrase family based on family criteria and comparison between candidate phrases of the plurality of candidate phrases to obtain consistent phrases;
   for remaining phrases not meeting all of the candidate identification criteria, associating, by the at least one processing device, at least one of the remaining phrases with a phrase family based on inconsistent phrase criteria to obtain inconsistent phrases; and
   generating, by the at least one processing device, an inconsistent phrase user interface including a representation of the phrase family, the consistent phrases and the inconsistent phrases.

2. The method of claim 1 further comprising:
   generating, by the at least one processing device, a phrase criteria user interface including an adjustable candidate identification criteria control, an adjustable family criteria control, and an adjustable inconsistent phrase criteria control.

3. The method of claim 1 wherein the inconsistent phrases are obtained based on comparison of the remaining phrases with at least one consistent phrase in each phrase family.

4. The method of claim 1 further comprising:
   generating a plurality of indices representative of text in the document; and
   wherein the identification of the plurality of candidate phrases is further based on the plurality of indices.

5. The method of claim 1 wherein the candidate identification criteria include at least one of a frequency of a phrase in the document, number of words in the phrase, and a number of characters in the phrase.

6. The method of claim 1 wherein the family criteria include a number of matching words in compared phrases and a percentage of matching words within a specified proximity of the compared phrases.

7. An apparatus configured to perform electronic document analysis of a document and generate an inconsistent phrase user interface, the apparatus comprising
   at least one processing device; and
   memory operatively connected to the at least one processing device, the memory comprising executable instructions that when executed by the at least one processing device cause the at least one processing device to:
   identify a plurality of candidate phrases in the document based on candidate identification criteria;
   group candidate phrases of the plurality of candidate phrases with a phrase family based on family criteria and comparison between candidate phrases of the plurality of candidate phrases to obtain consistent phrases;
   for remaining phrases not meeting all of the candidate identification criteria, associate at least one of the remaining phrases with a phrase family based on inconsistent phrase criteria to obtain inconsistent phrases; and
   generate an inconsistent phrase user interface including a representation of the phrase family, the consistent phrases, and the inconsistent phrases.

8. The apparatus of claim 7, wherein the executable instruction, when executed by the at least one processing device, cause the at least one processing device to generate a phrase criteria user interface including an adjustable candidate identification criteria control, an adjustable family criteria control, and an adjustable inconsistent phrase criteria control.

9. The apparatus of claim 7 wherein the inconsistent phrases are obtained based on comparison of the remaining phrases with at least one consistent phrase in each phrase family.

10. The apparatus of claim 7, wherein the executable instruction, when executed by the at least one processing device, cause the at least one processing device to generate a plurality of indices representative of text in the document; and
    wherein the identification of the plurality of candidate phrases is further based on the plurality of indices.

11. The apparatus of claim 7 wherein the candidate identification criteria include at least one of a frequency of a phrase in the document, a number of words in the phrase, and a number of characters in the phrase.

12. The apparatus of claim 7 wherein the family criteria include a number of matching words in compared phrases and a percentage of matching words within a specified proximity of the compared phrases.

13. A non-transitory computer readable medium comprising executable instructions that when executed by at least one processing device cause the at least one processing device to perform electronic document analysis of a document, including generation of an inconsistent phrase user interface in which the at least one processing device is caused to:
    identify a plurality of candidate phrases in the document based on candidate identification criteria;
    group candidate phrases of the plurality of candidate phrases with a phrase family based on family criteria and comparison between candidate phrases of the plurality of candidate phrases to obtain consistent phrases;

for remaining phrases not meeting all of the candidate identification criteria, associate at least one of the remaining phrases with a phrase family based on inconsistent phrase criteria to obtain inconsistent phrases; and generate an inconsistent phrase user interface including a representation of the phrase family, the consistent phrases, and the inconsistent phrases.

14. The non-transitory computer readable medium of claim 13, wherein the executable instruction, when executed by the at least one processing device, cause the at least one processing device to generate a phrase criteria user interface including an adjustable candidate identification criteria control, an adjustable family criteria control, and an adjustable inconsistent phrase criteria control.

15. The non-transitory computer readable medium of claim 13 wherein the inconsistent phrases are obtained based on comparison of the remaining phrases with at least one consistent phrase in each phrase family.

16. The non-transitory computer readable medium of claim 13, wherein the executable instruction, when executed by the at least one processing device, cause the at least one processing device to generate a plurality of indices representative of text in the document; and wherein the identification of the plurality of candidate phrases is further based on the plurality of indices.

17. The non-transitory computer readable medium of claim 13 wherein the candidate identification criteria include at least one of a frequency of a phrase in the document, a number of words in the phrase, and a number of characters in the phrase.

18. The apparatus of claim 13 wherein the family criteria include a number of matching words in compared phrases and a percentage of matching words within a specified proximity of the compared phrases.

* * * * *